United States Patent
Robertson et al.

(10) Patent No.: US 7,685,044 B1
(45) Date of Patent: Mar. 23, 2010

(54) LOW LATENCY TRADING SYSTEM

(75) Inventors: Chris Robertson, New York, NY (US);
Rick Bruno, New York, NY (US);
Saranyu Lavanyakul, Jersey City, NJ (US)

(73) Assignee: Morgan Stanley, New York, NY (US)

( * ) Notice: Subject to any disclaimer, the term of this patent is extended or adjusted under 35 U.S.C. 154(b) by 265 days.

(21) Appl. No.: 11/801,957

(22) Filed: May 11, 2007

(51) Int. Cl.
*G06Q 40/00* (2006.01)
(52) U.S. Cl. .................... 705/35; 705/36 R; 705/37
(58) Field of Classification Search ............... 705/35, 705/36 R, 37, 38, 26, 1
See application file for complete search history.

(56) References Cited

U.S. PATENT DOCUMENTS

| | | | |
|---|---|---|---|
| 7,490,061 B2 * | 2/2009 | Kathwari et al. | 705/37 |
| 2002/0156719 A1 * | 10/2002 | Finebaum et al. | 705/37 |
| 2005/0119965 A1 * | 6/2005 | Kathwari et al. | 705/37 |
| 2006/0015436 A1 * | 1/2006 | Burns et al. | 705/37 |
| 2006/0085317 A1 | 4/2006 | Allen | |
| 2006/0259417 A1 | 11/2006 | Marynowski et al. | |
| 2007/0025351 A1 | 2/2007 | Cohen | |
| 2008/0126832 A1 * | 5/2008 | Morosan et al. | 714/4 |
| 2008/0270283 A1 * | 10/2008 | Boni et al. | 705/37 |

OTHER PUBLICATIONS

Anonymous "TransactTools Launches FAST, Extends Market Leadership Position for High-Performance Standards-Based Financial Messaging." Oct. 28, 2005, PRNewswire.*
Anonymous"TwinTrader.com Reports on OTCBB Dollar Volume Movers and Focus Stock of the Day." Jun, 19, 2006 M2 Presswire.*
"Cisco Application-Oriented Networking Streamlines Financial Market-Data and Trade-Order Latency," Cisco Systems, Inc., 2006.
Hod, Zohar, "Algorithms for financial markets," Building an Edge—the Financial Services Newsletter, vol. 8, No. 1, Feb. 27, 2007.
Mehta, Nina, "Trades Battle Latency with: Fast Data Applications," Traders Magazine, Feb. 24, 2006.
Formby, Kevin, "Low latency exchange connectivity," Mondo Visione, Ltd., 2007.

* cited by examiner

*Primary Examiner*—Kelly Campen
(74) *Attorney, Agent, or Firm*—K&L Gates LLP (57) ABSTRACT

Systems and methods for transmitting trade orders from a client trading engine to an exchange where the trades are executed. The system may comprise a low latency system in communication with the client trading engine and the exchange server(s). The low latency system is for receiving trade orders from the client trading engine, performing one or a limited number of pre-order risk checks on the trade orders, and, when the trade orders pass the risk checks, transmitting the trade order to the exchange server(s). The system also comprises a post-order risk checking data center in communication with the low latency system via a network. The post-order risk checking data center is for performing post-order risk checks on the trade orders after the low latency system transmits the trade orders to the exchange server(s).

65 Claims, 6 Drawing Sheets

LOW LATENCY TRADING SYSTEM

BACKGROUND

In the financial markets, many market participants implement investment strategies that require computerized trading engines that execute trades autonomously based on the most-up-to-date, or real time, market data. These trades are often executed in milliseconds after receiving the market data and, in some instances, a few milliseconds can be the difference a winning trade and a losing trade. One of the factors that contributes to the delay is the latency, or time interval, between (a) when the trading engine sends a trade order to the exchange and (b) when the trade order is acknowledged and acted upon by the exchange.

Figure 1A:
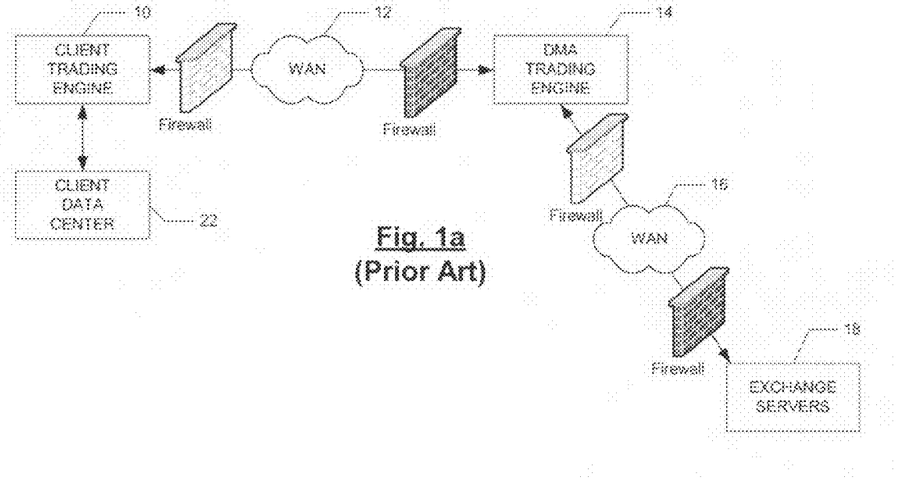
FIGS. 1a and 1b are diagrams of prior art trading systems.

FIG. 1a is a simplified diagram of a known trading architecture. The client trading engine 10 receives the market data, analyzes it, and based thereon sends a trade order over a Wide Area Network (WAN) 12 to a Direct Market Access (DMA) trading engine 14 that is hosted by a registered broker/dealer. The DMA trading engine 14 performs risk checking and order validation on the trade order and, if the order is not rejected, sends it over another WAN 16 to the exchange server 18, where the trade is executed. The exchange server 18 then sends a report back to the DMA trading engine 14 for the trade order. The DMA trading engine 14 then performs a variety of post-trade risk checks.

In such an architecture, the order is sent over two WANs 12, 16, and through a number of firewalls. Also, the client trading engine 10 and the DMA trading engine 14 typically communicate using a different communication protocol than the DMA trading engine 14 uses to communicate with the exchange data center 18. Thus, the DMA trading center 14 must also convert the order from one protocol to another, adding to the latency.

The client trading engine 10 is also in communication with the client data center 22, so that the client data center 22 can track the trades executed by the client trading engine 10.

Figure 1B:
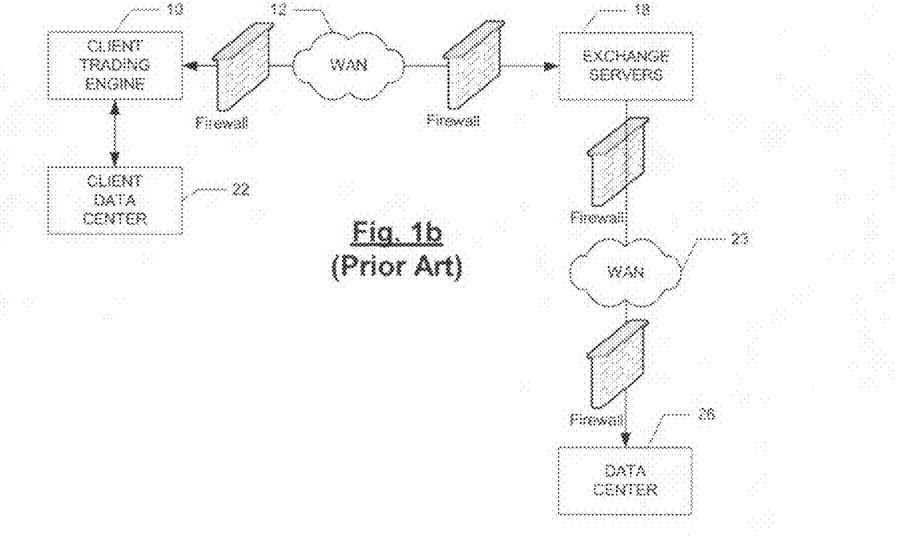

Another known architecture is for the client trading engine 10 to submit orders directly to the exchange servers 18 via the WAN 12, as shown in FIG. 1b. This architecture has the advantage of reduced latency, but there is no pre-trade risk checking in this architecture (except for pre-trade risk checks performed by the client, if any) after the order is sent from the client trading engine 10 and before the order gets to the exchange servers 18. Post-trade risk checking is performed in this scenario after the trade is submitted to the exchange by a data center 26 in communication with the exchange server 18 via a WAN 23.

SUMMARY

In one general aspect, the present invention is directed to systems and methods for transmitting trade orders from a client trading engine to a trading exchange, where the orders are executed by one or more servers of the exchange data center. According to various embodiments, the system comprises a low latency system, comprising one or more servers, in communication with the client trading engine and the exchange server(s). The low latency system is for receiving trade orders from the client trading engine, performing one or a limited number of pre-order risk checks on the trade orders, and, when the trade orders pass the risk check(s), transmitting the trade order to the exchange server(s). The system also comprises a post-order risk checking data center in communication with the low latency system via a communications network (e.g., a WAN). The post-order risk checking data center is for performing post-order risk checks on the trade orders after the low latency system transmits the trade orders to the exchange server(s). That way, the server center can be relatively lightweight and perform only a small number of pre-trade risk checks in order to decrease latency.

Also, in various implementations, there are zero network (e.g., WAN) hops between the client trading engine and the low latency system, and there are also zero network (e.g., WAN) hops between the client trading engine and the exchange server(s). Eliminating the network hops between the various servers can also decrease the system latency. Also, the client trading engine, the low latency system, and the exchange server(s) may be co-located at the exchange data center. In addition, the low latency system may communicate with the client trading engine using the same exchange communication protocol that the low latency system uses to communicate with the exchange server(s).

In various implementations, the low latency system may be configured to maintain separate communication protocol sessions with the client trading engine and the exchange server(s). In other embodiments, the trade orders may be forwarded by the low latency system to the exchange server(s) using the same protocol session that the low latency server session received the trade orders from the client trading engine. In such an embodiment, in order to maintain the sequence numbering for messages sent between the client trading engine and the exchange server(s) on the common protocol session, the low latency system may be configured to send a modified trade order to the exchange server(s) when a trade order from the client trading engine fails a pre-trade risk check that causes the exchange server(s) to reject the trade. In another embodiment, the low latency system may be configured to send a non-trade order message to the exchange server(s) when a trade order from the client trading engine fails a pre-trade risk check to maintain the sequence numbering. In another embodiment, the low latency system may be configured to manage the sequence numbers of messages sent between the client trading engine and the exchange server(s) on the common protocol session and calculate the correct sequence numbers for the messages.

These and other potential benefits and advantages of the present invention will be apparent from the description to follow.

FIGURES

Various embodiments of the present invention are described herein by way of example in conjunction with the following figures wherein.

DETAILED DESCRIPTION

Figure 2:
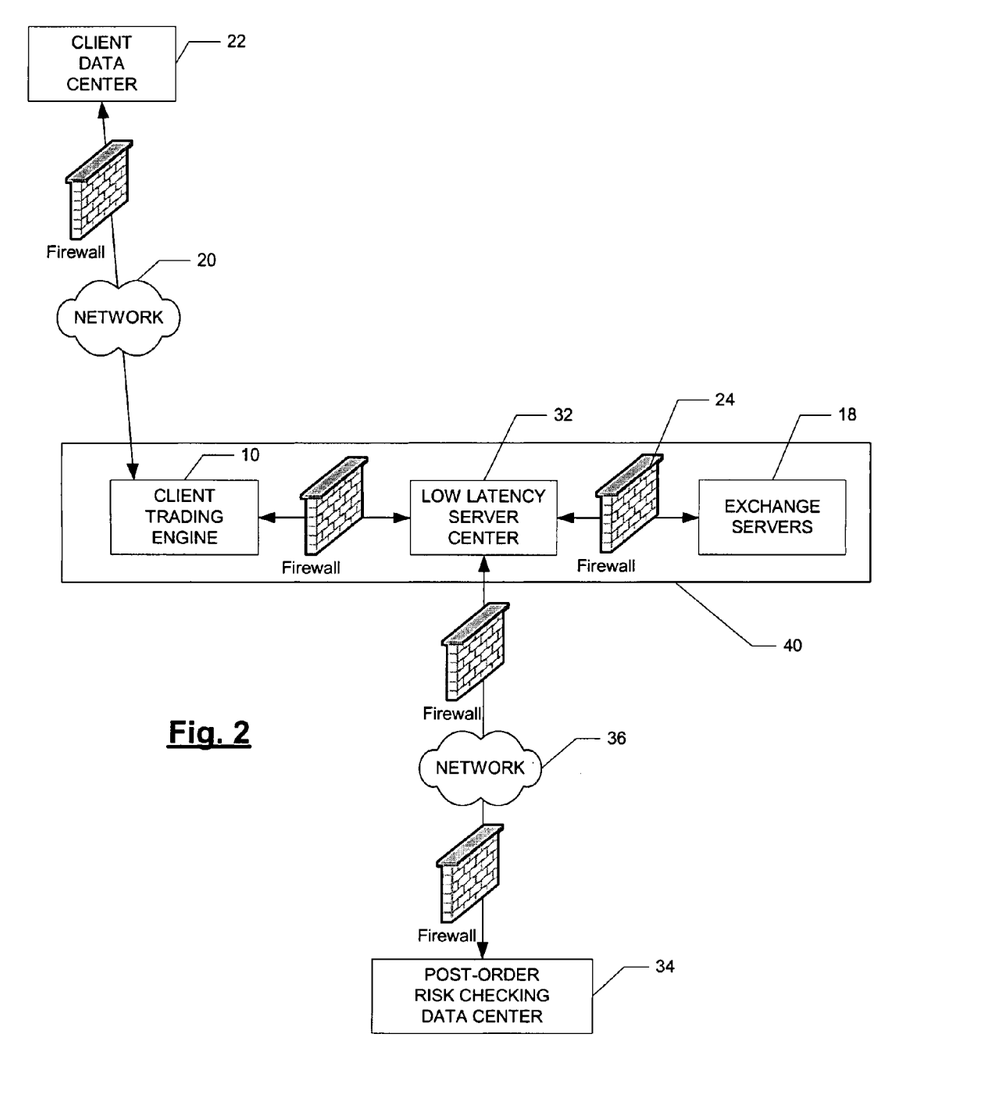
FIG. 2 is a diagram of a trading system according to various embodiments of the present invention.

FIG. 2 is a diagram of a trading system or architecture 30 according to various embodiments of the present invention. In the architecture 30 of FIG. 2, the client trading engine 10 sends its trade order to a low latency system 32, which may be hosted by a broker/dealer registered with the exchange. The low latency system 32, which may comprise one or more low latency servers as described further below, performs pre-trade risk checking and order validation on the order and, if acceptable, transmits the order to the exchange servers 18, where the trade is executed. If the trade order is determined not to be acceptable by the low latency system 32, the low latency system 32 may reject the trade. The trade order may be, for example, an order to buy or sell a quantity of units of a publicly traded security (such as a stock or bond). Also, the trade order could be an order to enter into a derivative contract where, for example, the exchange is a derivatives exchange.

As shown in FIG. 2, the client trading engine 10 may be in communication with the client data center 22 via a communication network 20.

In comparison with the prior art system shown in FIG. 1a, where the DMA trading engine 14 performs a variety of pre-trade risk checks, the low latency system 32 may perform only one or a few pre-trade risk checks. For example, in one embodiment, the low latency system 32 may only check the quantity traded in the trade order (e.g., whether it is too high or too low). If the quantity is not within the prescribed limits, the low latency system 32 may reject the trade. If the quantity is within prescribed limits, the low latency system 32 may forward the order to the exchange servers 18. The low latency system 32 may also provide some non-risk pre-order checks that do not significantly negatively affect the latency, such as compliance checks for compliance with Regulation NMS.

A post-order risk checking data center 34, in communication with the low latency system 32 via a communications network 36, may perform more sophisticated near-time post-order risk checking and validation on the order that the low latency system 32 does not perform. Such post-order risk checks performed by the data center 34 may include, for example, complex market impact analysis (e.g., how will the trade impact the market) and determinations of whether the trade goes against other positions of the client. If a trade order fails a post-order risk check, in some instances it may still be possible to cancel the trade if it has not yet been executed by the exchange. Also, a failure of a post-order risk check could cause certain future orders to be rejected and/or cause the client trading engine 10 to change or revise its trading strategy. Because in such embodiments the more comprehensive and computationally expensive risk checks are performed by the post-order risk checking data center 34 after the trade order is sent to the exchange servers 18, the low latency system 32 can be relatively lightweight and perform only a small or limited number of pre-trade risk checks in order to decrease latency.

The communications networks 20, 36 may be any suitable type of computer network, such as a LAN, WAN, MAN, etc., and may use any suitable communication protocol, such as TCP/IP.

Figure 3A:
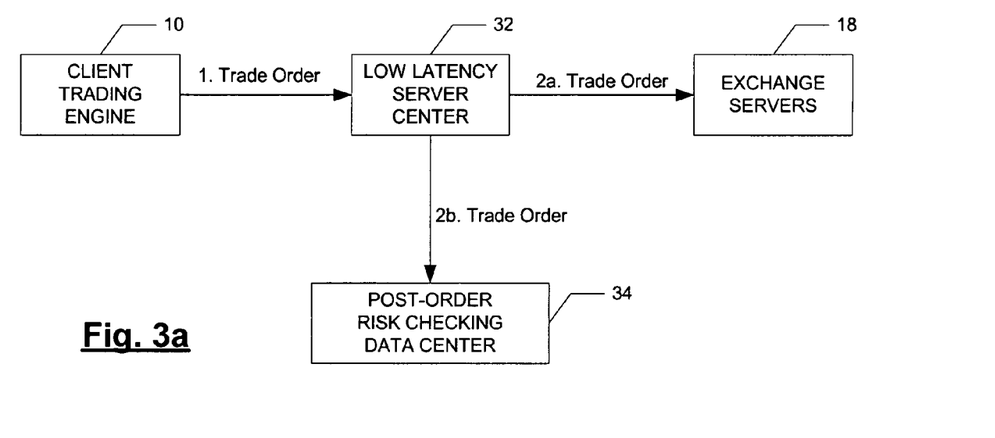
FIGS. 3a-c and 4 illustrate methods of operation for the trading system of FIG. 2 according to various embodiments of the present invention.
Figure 3B:
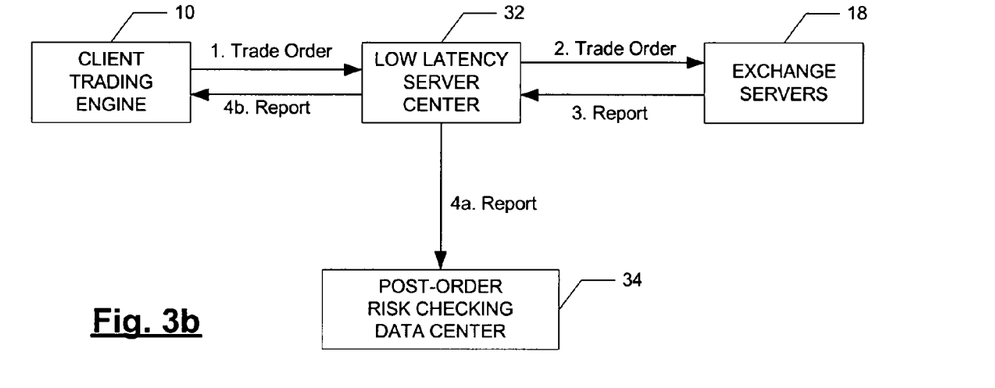

In one embodiment, as shown in FIG. 3a, the low latency system 32, in addition to sending the trade order to the exchange servers 18 (step 2a), may also send the order to the post-order risk checking data center 34 (step 2b), contemporaneously or nearly contemporaneously with sending the trade order to the exchange 18, in order for the post-order risk checking data center 34 to commence the post-order risk checking. In another embodiment, as shown in FIG. 3b, the low latency system 32 transmits the order to the exchange 18 (step 2), which (at step 3) sends back a report for the trade to the low latency system 32. The low latency system 32 may then send the report to both the post-order risk checking data center 34 (step 4a) and the client trading engine (step 4b).

Figure 3C:
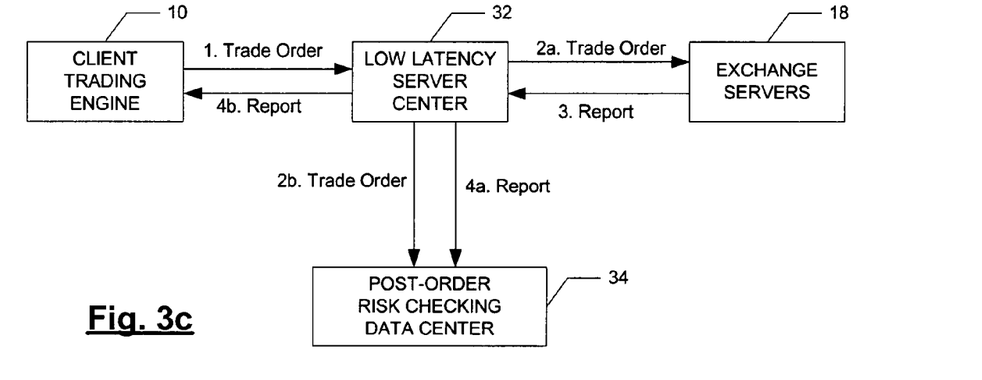

FIG. 3c shows an embodiment that is basically the combination of the embodiments of FIGS. 3a and 3b. After receiving the trade order from the client trading engine 10 (step 1), the low latency system 32 sends the trade order to both the exchange servers 18 (step 2a) and to the post-order risk checking data center (step 2b). Then, the exchange servers 18 send back a report for the trade to the low latency system 32 (step 3). The low latency system 32 may then send the report to both the post-order risk checking data center 34 (step 4a) and the client trading engine (step 4b).

Figure 4:
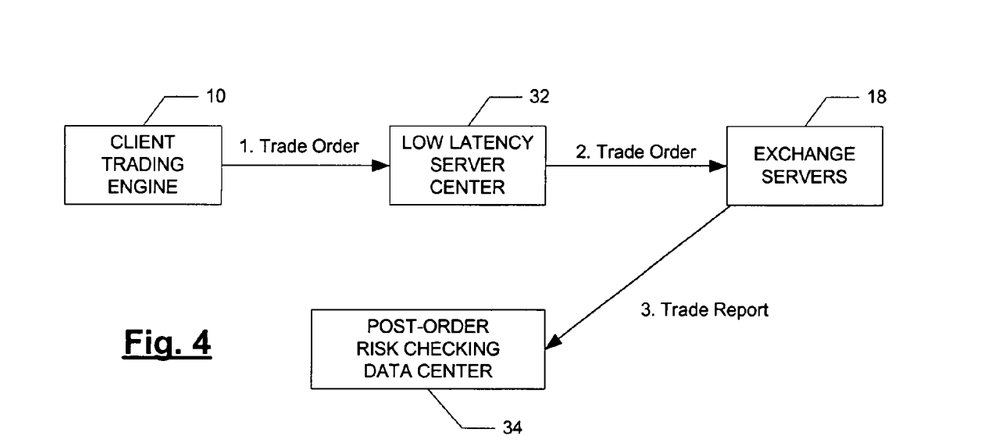

In another embodiment, as shown in FIG. 4, the exchange servers 18 may send a report on the trade to the post-order risk checking data center 34, via the network 36, in order for the post-order risk checking data center 34 to commence the risk checking. In either case, the data center 34 performs the more comprehensive risk checks after the low latency system 32 transmits the order to exchange 18. Also, in either embodiment, the data center 34 may send the results of its post-trade risk checking and order validation to the client data center 22 (see FIG. 2).

As can be seen by comparing FIG. 1a to FIG. 2, in the architecture of FIG. 2 there a no networks (hence, no network hops) between the client trading engine 10 and the exchange servers 18, whereas there are two WAN hops in the architecture of FIG. 1a. Further, as mentioned above, the low latency system 32 in FIG. 2 may provide only one or a small number of pre-trade risk checks in comparison with the more comprehensive risk checking performed by the DMA trading engine 14 in FIG. 1a. These factors contribute to the low latency of the architecture of FIG. 2 in comparison with the architecture of FIG. 1a.

In addition, in order to further reduce latency, the client trading engine 10, the low latency system 32, and the exchange servers 18 may be co-located at a data center 40 for the exchange in one embodiment. Co-locating the servers 10, 32, 18 at one data center 40 will ordinarily reduce the time that it takes the data packets to travel between components. In other embodiments, if the exchange does not have the capability to physically host the client trading engine 10 and the low latency system 32, the client trading engine 10 and the low latency system 32 could be co-located in a co-location facility (not shown) that is physically near the exchange servers 18 (e.g., within 1 mile or within 5 miles). Also, in other embodiments, the low latency system 32 could be co-located with the exchange servers 18 at the data center 40, and the client trading engine 10 could be nearby (e.g., within 5 miles).

In various embodiments, the client trading engine 10 may communicate with the low latency system 32 using a communication protocol that is the same as the exchange communication protocol used by the low latency system 32 to communicate with the exchange servers 18. For example, both communication links may use the FIX (Financial Information eXchange) protocol, the OUCH protocol, the CMS (Common Message Switch) protocol, or any other suitable protocol. In one embodiment, the low latency system 32 may maintain two protocol sessions: one with the client trading engine 10 and another one with the exchange servers 18.

In another embodiment, there may be one protocol session between the client trading engine 10 and the exchange servers 18, with the low latency system 32 acting only to receive and forward traffic between the client trading engine 10 and the exchange servers 18 on the session. In most exchange protocols, the sender and receiver maintain a sequence number of the messages sent to one another. This is a common mechanism for detecting lost messages. Because the low latency system 32 performs one or more pre-trade risk checks on the trade orders and may reject a trade that fails a pre-trade risk check such that the trade order is not forwarded to the exchange servers 18, the low latency system 32 preferably addresses the sequence numbering issue in such an embodiment so that the next trade order after the rejection would not appear to the exchange servers 18 to have skipped a sequence number. Similarly, if the sequence numbering is not addressed, if an exchange server 18 responded with its next sequence number, the client trading engine 10 would receive duplicated sequence numbers as the number was already sent by the rejected message to the client trading engine 10 from the low latency system 32.

To solve this problem, in one embodiment, when the low latency system 32 determines that a trade order that fails a pre-trade risk check, the low latency system 32 may be configured to reject the trade by sending a modified trade order to the exchange servers 18, where the trade order is modified in such a way that the exchange servers 18 reject the trade. The low latency system 32 can modify the trade order in such a way, for example, by modifying the data in the order or adding extra information (e.g., setting a flag) in the order that causes the exchange servers 18 to reject the trade. In such an embodiment, the sequence numbering remains correct.

In rare instances where there are many rejections, the low latency system 32 may have to send many of these modified trade orders to the exchange servers 18, which may negatively affect the latency of the low latency system 32. In such instances, the low latency system 32 may be configured to drop the connection with the exchange servers 18 (or otherwise stop forwarding messages to the exchange servers 18).

In another embodiment, instead of sending a modified trade order to the exchange servers 18, the low latency system 32 may be configured to send a non-trade order message to the exchange servers 18 to maintain the sequence numbering, The non-trade order message may be, for example, a heartbeat message. This type of session control message will effectively increase the sequence number of the exchange as if it received the rejected trade order. The low latency system 32 may then use the sequence number from the exchange to create a reject message to send back to the client trading engine 10.

In yet another embodiment, instead of sending modified trade orders or non-trade order messages, the low latency system 32 may be programmed to manage the sequence number on both ends and calculate the correct sequence number to be sent to both sides.

Figure 5:
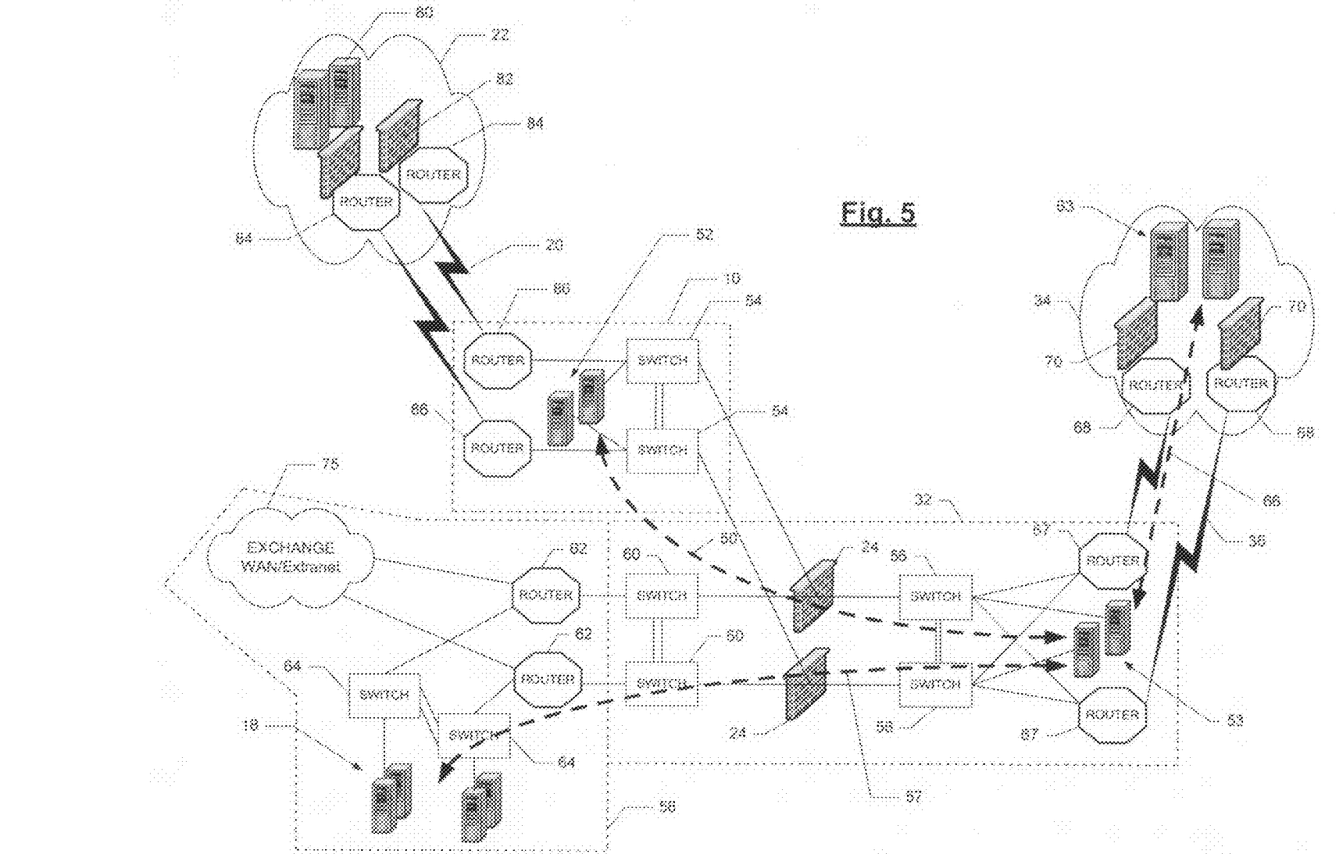
FIG. 5 is a more detailed diagram of the trading system of FIG. 2 according to various embodiments of the present invention.

FIG. 5 is a more detailed diagram of the architecture according to various embodiments of the present invention. As shown by the arrow 50, the client trading engine 10, comprising one or more servers 52, transmits the trade order to the low-latency servers 53 of the low latency system 32 via the firewall(s) 24, the client trading engine switches 54, and the low-latency server center switches 56. The low-latency servers 53, after performing the pre-order risk check, may then transmit the order, as shown by the arrow 57, to the server farm 18 of the exchange 58 via the low-latency server switches 56, 60, the firewall 24, the exchange routers 62, and the exchange switches 64. The switches 54, 56, 60, 64 may be layer 2 and/or layer 3 switches, for example. As shown by the arrow 66, the servers 53 of the low latency system 32 may also transmit the order to the servers 63 of the post-order risk checking data center 34 via the server center routers 67, the network 36, the broker/dealer data center routers 68, and the broker/dealer data center firewall 70. The servers 63 of the post-order risk checking data center 34 may perform the post-order risk checking and order validation, as described above.

FIG. 5 also shows the exchange WAN/extranet 75. Also, the client data center 22 is shown in communication with the client trading engine 10 via the network 20. As shown in FIG. 5, the client data center 22 may comprise servers 80 in communication with the client trading engine 10 via a firewall 82, client data center routers 84, the network 20, and the client trading engine routers 86. Also, although not show in FIG. 5, the post-order risk checking data center 34, which may be administered by a broker/dealer that also administers the low latency system 32, may be in communication with the client data center 22 via a network, such as a WAN (not shown). In other embodiments, the low latency system 32 and the data center 34 may be administered by different entities.

In various embodiments, in addition to quantity pre-trade risk checking, the low latency system 32 could perform additional pre-trade risk checks, so long as the additional checks do not increase the latency beyond acceptability. Such additional pre-trade risk checks may include checks on the number of trade orders submitted by the client trading engine 10 in a certain time period. For example, if the number of trades per second from the trading engine 10 is above a threshold limit, the low latency system 32 may reject some or all of the trades. Also, the low latency system 32 could check the value of a trade to make sure it is within acceptable limits.

In addition, according to various embodiments, the post-order risk checking data center 34 may be able to make administrative changes to the low latency system 32. For example, the data center 34 could send an instruction to the low latency system 32 to turn off during trading hours, thereby preventing all trades from the client trading engine 10 from getting through to the exchange servers 18.

FIGS. 2-5 show only one client trading engine 10 and one low latency system 32. It should be noted that in various embodiments, a single server 53 of the low latency system 32 could service a number of client trading engines 10, or there could be a separate server 53 for each client trading engine 10. Also, two or more servers 53 could service a single client trading engine 10. Also, an enterprise, such as a broker/dealer, could establish such low latency systems 32 at a number of exchanges 18, and each of the server centers 32 could be in communication with a single data center 34 for post-order risk checking. Alternatively, there could be a number of data centers 34 for serving the numerous server centers 32.

In addition, the architecture could be scaled by adding more clients to router pair 67. Route/packet filtering could be employed on the routers 67 to prevent different clients from communicating with each other via the routers 67. Also, in an embodiment where the client trading engine 10 and low latency system 32 are located at a co-location facility and not directly at the exchange 18, the components of the low latency system 32 of the client trading engine 10 shown in FIG. 5 could be co-located at the co-location facility. The latency in such an embodiment would be higher than if the low latency system 32 and the trading engine 10 where co-located at the exchange 18, but such an environment could scale across multiple exchanges. For example, the switch pair 60 could be switches or wan routers, and multiple exchanges could be connected to router/switch pair 60.

Figure 6:
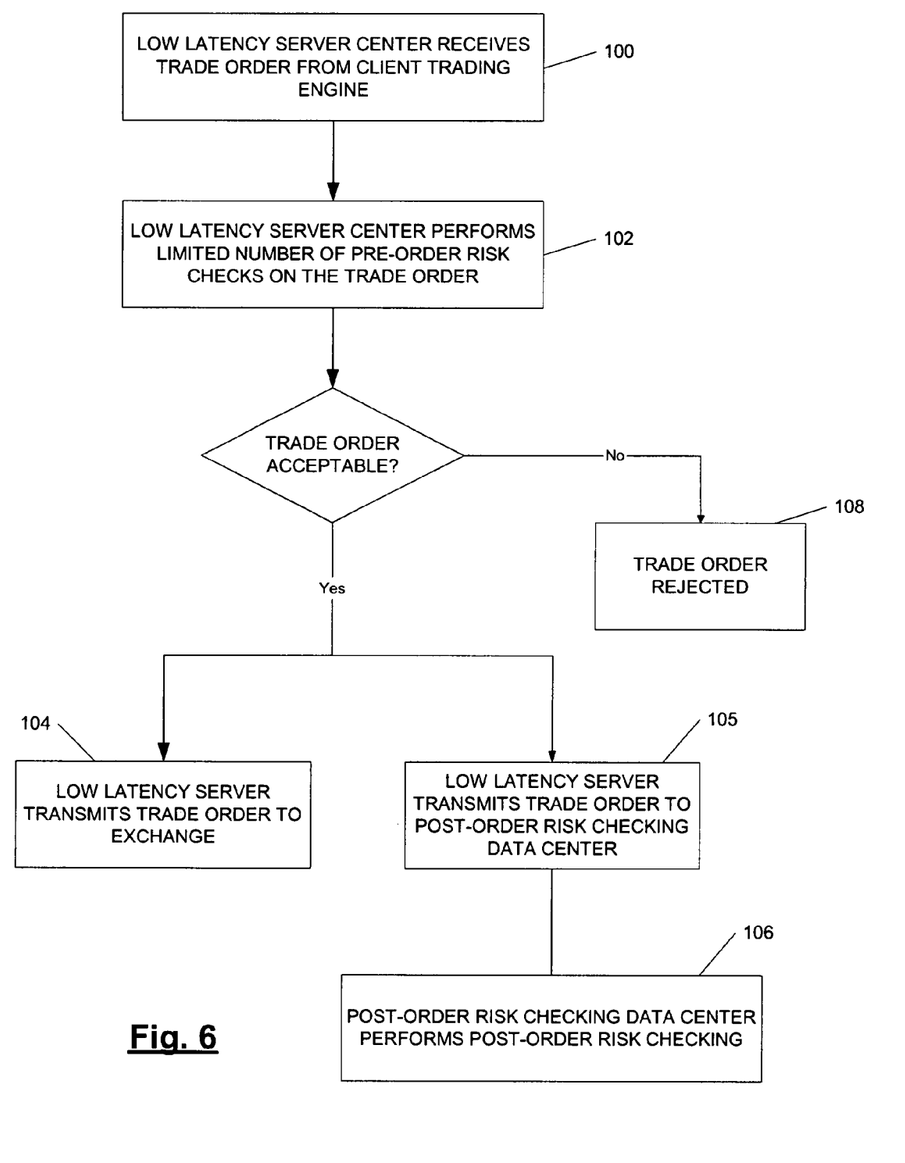
FIG. 6 is a diagram of a flowchart of a process according to various embodiments of the present invention.

FIG. 6 is a flow chart of the process according to various embodiments of the present invention. At step 100, the low latency system 32 receives a trade order from the client trading engine 10. As mentioned above, the order may be sent without a WAN hop to decrease latency. At step 102, the server center performs a limited number of pre-order risk checks on the trade order. The pre-order risk checks may be limited in number so that the servers 53 of the low latency system 32 (see FIG. 5) can remain relatively lightweight, thereby decreasing the trade latency. If the order is acceptable, at step 104 the trade is transmitted by the low latency system 32 to the exchange 18, where it is executed. At step 105, the order is also sent to the post-order risk checking data center 34, which, at step 106, performs the post-order risk checks. As mentioned above, in certain embodiments steps 104 and 105 may be performed simultaneously or nearly simultaneously. Also, as shown in FIGS. 3b and 4, in some embodiments the low latency system 32 may only send the trade order to the exchange servers 18, and the post-order risk checking data center 34 may perform the post-order risk checks based on a report, received directly or indirectly, from the exchange servers 18. Returning to step 102, if the order is not acceptable, the order is rejected at step 108.

In other embodiments, the low latency system 32 may provide other functionality while remaining low latency. For example, the trade order from the client trading engine 10 may be an order to enter into a swap contract based on the current price for an underlier (e.g., a security or commodity) traded on the exchange 18. In such cases, the low latency system 32 may send a corresponding trade order to the exchange 18 to buy or sell the underlier, as the case may be, to hedge the swap. For example, if the client wants to enter into an equity swap such that the client receives on its leg the return on an underlying equity traded on the exchange 18, the low latency system 32 may send a corresponding trade order to the exchange 18 to buy the equity to thereby hedge its exposure on the swap.

In various embodiments disclosed herein, a single component may be replaced by multiple components and multiple components may be replaced by a single component, to perform a given function or functions. Except where such substitution would not be operative, such substitution is within the intended scope of the embodiments. Any servers described herein, for example, may be replaced by a "server farm" or other grouping of networked servers that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations and adaptations to those embodiments may occur to persons skilled in the art with attainment of at least some of the advantages. For example, certain steps in the processes described above may be performed in different orders or at the same time. The disclosed embodiments are therefore intended to include all such modifications, alterations and adaptations without departing from the scope of the embodiments as set forth herein.

What is claimed is:

1. A low-latency system for receiving electronic trade orders from a computer-implemented client trading engine and transmitting the electronic trade orders to one or more exchange servers of an exchange where the trade orders are to be executed, the system comprising:
   a low latency system that communicates with the client trading engine and that communicates with the one or more exchange servers, wherein the low latency system comprises at least one server, and wherein the low latency system is configured to:
   receive a trade order from the client trading engine;
   perform one or more pre-order risk checks on the trade order, wherein the one or more pre-order risk checks are different from and computationally less expensive than post-order risk checks performed on the trade order by a post-order risk checking data center that comprises at least one server;
   transmit the trade order to the one or more exchange servers when the trade order passes the one or more pre-order risk checks, wherein the one or more exchange servers implement a message protocol and maintain a message sequence number; and
   maintain a single protocol session between the client trading engine and the one or more exchange servers such that consistent message sequence numbering is maintained between the client trading engine and the one or more exchange servers in the event the trade order fails the one or more pre-order risk checks, wherein configuration of the low latency system to maintain consistent message sequence numbering upon pre-order risk check failure comprises:
      modifying the trade order received from the client trading engine; and
      sending the modified trade order to the exchange servers, wherein the trade order is modified so that the one or more exchange servers reject the trade order.

2. The system of claim 1, wherein:
   there are zero wide-area network (WAN) hops between the client trading engine and the low latency system; and
   there are zero WAN hops between the low latency system and the one or more exchange servers.

3. The system of claim 1, wherein the client trading engine, the low latency system, and the one or more exchange servers are co-located at a data center.

4. The system of claim 1, wherein the low latency system and the one or more exchange servers are co-located at a data center.

5. The system of claim 1, wherein the low latency system communicates with the client trading engine using an exchange communication protocol that is the same as the exchange communication protocol used by the low latency system to communicate with the one or more exchange servers.

6. The system of claim 5, wherein:
   there are zero WAN hops between the client trading engine and the low latency system; and
   there are zero WAN hops between the low latency system and the one or more exchange servers.

7. The system of claim 6, wherein the one or more pre-order risk checks performed by the low latency system includes a trade quantity check.

8. The system of claim 1, wherein the one or more pre-order risk checks performed by the low latency system comprises three or less pre-order risk checks.

9. The system of claim 8, wherein the three or less pre-order risk checks performed by the low latency system comprise only one pre-order risk check.

10. The system of claim 9, wherein the only one pre-order risk check is a trade quantity check.

11. The system of claim 8, wherein the three or less pre-order risk checks performed by the low latency system comprise a trade quantity check and a check on the number of trade orders submitted by the client trading engine in a period of time.

12. The system of claim 8, wherein the three or less pre-order risk checks performed by the low latency system comprise a trade quantity check and a check on whether a value of the trade order is within limits.

13. The system of claim 1, wherein the low latency system comprises at least one router in communication with the at least one server of the low latency system.

14. The system of claim 13, wherein the low latency system comprises at least one layer 2 switch connected to the at least one router and the at least one server of the low latency system.

15. The system of claim 1, wherein the low latency system modifies the trade order by changing data in the trade order that causes the one or more exchange servers to reject the trade order.

16. The system of claim 1, wherein the low latency system modifies the trade order by adding data to the trade order that causes the one or more exchange servers to reject the trade order.

17. The system of claim 1, wherein the low latency system is configured to stop transmitting modified trade orders in the event of many trade order failures.

18. The system of claim 1, wherein the low latency system communicates with the post-order risk checking data center and is configured to send the trade order to the post-order risk checking data center contemporaneously or nearly contemporaneously with sending the trade order to the one or more exchange servers.

19. The system of claim 18, wherein the trade order sent to the one or more exchange servers commences the post-order risk checking.

20. The system of claim 1, wherein the low latency system communicates with the post-order risk checking data center and is configured to receive an acknowledgement of order report from the one or more exchange servers and to send the report to the post-order risk checking data center.

21. The system of claim 1, wherein the post-order risk checking data center communicates with the one or more exchange servers and is configured to receive an acknowledgement of order report from the one or more exchange servers to commence the post-order risk checking.

22. The system of claim 1, wherein the post-order risk checks are performed on the trade order after the low latency system transmits the trade order to the one or more exchange servers.

23. The system of claim 1, wherein the post-order risk checks comprise a market impact analysis.

24. A computer-implemented method for transmitting electronic trade orders from a computer-implemented client trading engine to one or more exchange servers of an exchange where the trade orders are to be executed, the method comprising:
receiving at a low latency system a trade order transmitted by the client trading engine, wherein the low latency system comprises at least one server;
performing, by the low latency system, one or more pre-order risk checks on the trade order, wherein the one or more pre-order risk checks are different from and computationally less expensive than post-order risk checks performed on the trade order by a post-order risk checking data center that comprises at least one server;
when the trade order passes the one or more pre-order risk checks, transmitting, by the low latency system, the trade order to the one or more exchange servers, wherein the one or more exchange servers implement a message protocol and maintain a message sequence number; and
maintaining, by the low latency system, a single protocol session between the client trading engine and the one or more exchange servers such that consistent message sequence numbering is maintained between the client trading engine and the one or more exchange servers in the event the trade order fails the one or more pre-order risk checks, wherein maintaining message consistent sequence numbering upon pre-order risk check failure comprises:
modifying, by the low latency system, the trade order received from the client trading engine; and
sending, by the low latency system, the modified trade order to the one or more exchange servers, wherein the trade order is modified so that the one or more exchange servers reject the trade order.

25. The method of claim 24, wherein:
there are zero WAN hops between the client trading engine and the low latency system; and
there are zero WAN hops between the low latency system and the one or more exchange servers.

26. The method of claim 24, wherein the client trading engine, the low latency system, and the one or more exchange servers are co-located at a data center.

27. The method of claim 24, wherein the low latency system and the one or more exchange servers are co-located at a data center.

28. The method of claim 24, wherein the low latency system communicates with the client trading engine using an exchange communication protocol that is the same as the exchange communication protocol used by the low latency system to communicate with the one or more exchange servers.

29. The method of claim 28, wherein:
there are zero WAN hops between the client trading engine and the low latency system; and
there are zero WAN hops between the low latency system and the one or more exchange servers.

30. The method of claim 29, wherein the one or more pre-order risk checks performed by the low latency system includes a trade quantity check.

31. The method of claim 24, wherein the low latency system modifies the trade order by changing data in the trade order that causes the one or more exchange servers to reject the trade order.

32. The method of claim 24, wherein the low latency system modifies the trade order by adding data to the trade order that causes the one or more exchange servers to reject the trade order.

33. The method of claim 24, further comprising performing the post-order risk checking on the trade order by a post-order risk checking data center that is in communication with the low latency system via a communications network, wherein the post-order risk checks are performed after the low latency system transmits the trade orders to the one or more exchange servers.

34. The method of claim 33, further comprising sending the trade order from the low latency system to the post-order risk checking data center contemporaneously or nearly contemporaneously with sending the trade order from the low latency system to the one or more exchange servers.

35. The method of claim 34, wherein the trade order sent to the one or more exchange servers commences the post-order risk checking.

36. The method of claim 33, further comprising receiving by the low latency system an acknowledgement of order report from the one or more exchange servers and sending the report from the low latency system to the post-order risk checking data center.

37. The method of claim 33, further comprising receiving by the post-order risk checking data center an acknowledgement of order report from the one or more exchange servers to commence the post-order risk checking.

38. The method of claim 33, wherein the post-order risk checks are performed on the trade order after the low latency system transmits the trade order to the one or more exchange servers.

39. The method of claim 33, wherein the post-order risk checks comprise a market impact analysis.

40. A low-latency system for receiving electronic trade orders from a computer-implemented client trading engine and transmitting the electronic trade orders to one or more exchange servers of an exchange where the trade orders are to be executed, the system comprising:
a low latency system that communicates with the client trading engine and that communicates with the one or more exchange servers, wherein the low latency system comprises at least one server, and wherein the low latency system is configured to:
receive a trade order from the client trading engine;
perform one or more pre-order risk checks on the trade order, wherein the one or more pre-order risk checks are different from and computationally less expensive than post-order risk checks performed on the trade order by a post-order risk checking data center that comprises at least one server;
transmit the trade order to the one or more exchange servers when the trade order passes the one or more pre-order risk checks, wherein the one or more exchange servers implement a message protocol and maintain a message sequence number; and
maintain a single protocol session between the client trading engine and the one or more exchange servers such that consistent message sequence numbering is maintained between the client trading engine and the one or more exchange servers in the event the trade order fails the one or more pre-order risk checks, wherein configuration of the low latency system to maintain consistent message sequence numbering upon pre-order risk check failure comprises sending a non-trade order message to the one or more exchange servers.

41. The system of claim 40, wherein the non-trade order message is a type of control message that effectively increases a sequence number maintained by the one or more exchange servers as if the one or more exchange servers received the rejected trade order.

42. The system of claim 40, wherein the non-trade order message is a heartbeat message.

43. The system of claim 40, wherein the low latency system is further configured to receive a sequence number from the one or more exchange servers after transmitting the non-trade order message to the one or more exchange servers, and use the received sequence number to generate a reject message to be sent to the client trading engine.

44. The system of claim 40, wherein the low latency system communicates with the client trading engine using an exchange communication protocol that is the same as the exchange communication protocol used by the low latency system to communicate with the one or more exchange servers.

45. The system of claim 40, wherein the one or more pre-order risk checks performed by the low latency system comprises three or less pre-order risk checks.

46. The system of claim 45, wherein the three or less pre-order risk checks performed by the low latency system comprise only one pre-order risk check.

47. The system of claim 46, wherein the only one pre-order risk check is a trade quantity check.

48. The system of claim 45, wherein the three or less pre-order risk checks performed by the low latency system comprise a trade quantity check and a check on the number of trade orders submitted by the client trading engine in a period of time.

49. The system of claim 45, wherein the three or less pre-order risk checks performed by the low latency system comprise a trade quantity check and a check on whether a value of the trade order is within limits.

50. The system of claim 40, wherein the low latency system communicates with the post-order risk checking data center and is configured to send the trade order to the post-order risk checking data center contemporaneously or nearly contemporaneously with sending the trade order to the one or more exchange servers.

51. The system of claim 50, wherein the trade order sent to the one or more exchange servers commences the post-order risk checking.

52. The system of claim 40, wherein the low latency system communicates with the post-order risk checking data center and is configured to receive an acknowledgement of order report from the one or more exchange servers and to send the report to the post-order risk checking data center.

53. The system of claim 40, wherein the post-order risk checking data center communicates with the one or more exchange servers and is configured to receive an acknowledgement of order report from the one or more exchange servers to commence the post-order risk checking.

54. The system of claim 40, wherein the post-order risk checks are performed on the trade order after the low latency system transmits the trade order to the one or more exchange servers.

55. A computer-implemented method for transmitting electronic trade orders from a computer-implemented client trading engine to one or more exchange servers of an exchange where the trade orders are to be executed, the method comprising:
receiving at a low latency system a trade order transmitted by the client trading engine, wherein the low latency system comprises at least one server;
performing, by the low latency system, one or more pre-order risk checks on the trade order, wherein the one or more pre-order risk checks are different from and computationally less expensive than post-order risk checks performed on the trade order by a post-order risk checking data center that comprises at least one server;
when the trade order passes the one or more pre-order risk checks, transmitting, by the low latency system, the trade order to the one or more exchange servers, wherein the one or more exchange servers implement a message protocol and maintain a message sequence number; and
maintaining, by the low latency system, a single protocol session between the client trading engine and the one or more exchange servers such that consistent message sequence numbering is maintained between the client trading engine and the one or more exchange servers in the event the trade order fails the one or more pre-order risk checks, wherein maintaining consistent message sequence numbering comprises sending, by the low-latency system, a non-trade order message to the one or more exchange servers.

56. The method of claim 55, wherein the non-trade order message is a type of control message that effectively increases a sequence number maintained by the one or more exchange servers as if the one or more exchange servers received the rejected trade order.

57. The method of claim 55, wherein the non-trade order message is a heartbeat message.

58. The method of claim 55, further comprising:

receiving, by the low latency system, a sequence number from the one or more exchange servers after transmitting the non-trade order message to the one or more exchange servers; and sending, by the low latency system, to the client trading engine, a reject message that has a sequence number generated using the sequence number received from the one or more exchange servers.

59. The method of claim 55, wherein the low latency system communicates with the client trading engine using an exchange communication protocol that is the same as the exchange communication protocol used by the low latency system to communicate with the one or more exchange servers.

60. The method of claim 55, further comprising performing the post-order risk checking on the trade order by a post-order risk checking data center that is in communication with the low latency system via a communications network, wherein the post-order risk checks are performed after the low latency system transmits the trade orders to the one or more exchange servers.

61. The method of claim 60, further comprising sending the trade order from the low latency system to the post-order risk checking data center contemporaneously or nearly contemporaneously with sending the trade order from the low latency system to the one or more exchange servers.

62. The method of claim 61, wherein the trade order sent to the one or more exchange servers commences the post-order risk checking.

63. The method of claim 60, further comprising receiving by the low latency system an acknowledgement of order report from the one or more exchange servers and sending the report from the low latency system to the post-order risk checking data center.

64. The method of claim 60, further comprising receiving by the post-order risk checking data center an acknowledgement of order report from the one or more exchange servers to commence the post-order risk checking.

65. The method of claim 60, wherein the post-order risk checks are performed on the trade order after the low latency system transmits the trade order to the one or more exchange servers.

* * * * *